(12) United States Patent
Guo et al.

(10) Patent No.: US 8,988,845 B2
(45) Date of Patent: Mar. 24, 2015

(54) FORKLIFT AND AUTOMATED WAREHOUSE SYSTEM

(71) Applicants: Zhenhua Guo, Shenzhen (CN); Chunhao Wu, Shenzhen (CN); Kunhsien Lin, Shenzhen (CN); Yunshao Jiang, Shenzhen (CN); Minghu Qi, Shenzhen (CN); Zenghong Chen, Shenzhen (CN)

(72) Inventors: Zhenhua Guo, Shenzhen (CN); Chunhao Wu, Shenzhen (CN); Kunhsien Lin, Shenzhen (CN); Yunshao Jiang, Shenzhen (CN); Minghu Qi, Shenzhen (CN); Zenghong Chen, Shenzhen (CN)

(73) Assignee: Shenzhen China Star Optoelectronics Technology Co., Ltd, Shenzhen, Guangdong (CN)

( * ) Notice: Subject to any disclaimer, the term of this patent is extended or adjusted under 35 U.S.C. 154(b) by 320 days.

(21) Appl. No.: 13/699,634

(22) PCT Filed: Nov. 7, 2012

(86) PCT No.: PCT/CN2012/084211
§ 371 (c)(1),
(2) Date: Nov. 22, 2012

(87) PCT Pub. No.: WO2014/067171
PCT Pub. Date: May 8, 2014

(65) Prior Publication Data
US 2014/0126101 A1    May 8, 2014

(30) Foreign Application Priority Data
Nov. 2, 2012 (CN) .......................... 2012 1 0433651

(51) Int. Cl.
H05F 3/00    (2006.01)
H05F 3/04    (2006.01)
B60C 19/08   (2006.01)
B66F 9/07    (2006.01)
B65G 1/04    (2006.01)

(52) U.S. Cl.
CPC .. H05F 3/00 (2013.01); B66F 9/07 (2013.01); B65G 1/0407 (2013.01); *B65G 2207/10* (2013.01)
USPC .......................................... 361/213; 361/217

(58) Field of Classification Search
CPC ............... H05F 1/00; H05F 1/02; H05F 3/06; H01T 23/00
USPC .................. 361/212–217, 225–227, 229–231
See application file for complete search history.

(56) References Cited

U.S. PATENT DOCUMENTS

| 2,817,792 | A  | * | 12/1957 | Chew ............................. | 361/217 |
| 8,730,642 | B2 | * | 5/2014  | Guo et al. ...................... | 361/213 |
| 2010/0241306 | A1 | * | 9/2010 | Akisada et al. ................ | 701/35  |
| 2014/0240887 | A1 | * | 8/2014 | Canham ......................... | 361/215 |

FOREIGN PATENT DOCUMENTS

JP    2000252092 A  *  9/2000  .............. H05F 3/02

OTHER PUBLICATIONS

Abstract for JP 2000-252092. Sep. 14, 2000.*

* cited by examiner

*Primary Examiner* — Thienvu Tran
*Assistant Examiner* — Christopher Clark
(74) *Attorney, Agent, or Firm* — Andrew C. Cheng

(57) ABSTRACT

The present invention provides a forklift and a warehouse system. The forklift includes a hoisting apparatus, a fork, and a static electricity eliminating device. The hoisting apparatus is used to maneuver the fork and the static electricity eliminating device which supplies pressurized ionized airflow toward an area located above the fork. By way of forgoing, the accumulated static electricity can he electively drained and grounded. Furthermore, the accumulated static electricity within the warehouse system can be effectively controlled and eliminated.

20 Claims, 4 Drawing Sheets

FORKLIFT AND AUTOMATED WAREHOUSE SYSTEM

FIELD OF THE INVENTION

The present invention relates to a technical field of liquid crystal display device, and more particularly, to a forklift and a warehouse system.

DESCRIPTION OF PRIOR ART

In the filed of liquid crystal display panel, the production of the organic light-emitting diode panel is vulnerable to the static electricity and which plays a vital role in the yield of the panel. Accordingly, the static electricity has to be effectively drained, and controlled during each of the manufacturing processes.

Forklift is a very important equipment in the automation of the liquid crystal display, and it has been widely used in the disposing and retrieving the cartridge, in which the panels are stored, into a compartment of a storing tower of a ware house. During the move-in and move-out of the cartridge, the static electricity has to be carefully controlled and grounded during the operation so as to ensure the yield of the liquid crystal display device.

SUMMARY OF THE INVENTION

It is an object of the present invention to provide a forklift and automated warehouse system in which the static electricity can be effectively eliminated.

In order to resolve the issue encountered by the prior art, the present invention provides a technical solution by introducing a forklift which comprises a pair of pillars. A hoisting apparatus includes a pair of hoisting system each arranged to one of the pillars. A fork is provided, and a static electricity eliminating device which includes two static electricity eliminating units each arranged to one of the pillars; and wherein, the hoisting system drives the forklift and the static electricity eliminating units to move upward and downward along the pillars and the static electricity provides ionized wind to an area located above the forklift.

Wherein the static electricity can be rotated to a preset angle with respect to the hoisting system so as to provide the ionized wind toward the area above the forklift during the rotation.

Wherein the static electricity eliminating device includes a vertical shaft, a driving mechanism, and a stand for attaching the static electricity eliminating device onto the hoisting apparatus, wherein the driving mechanism drives the vertical shaft to rotate such that the static electricity eliminating device will rotate with respect to the hoisting system.

Wherein the static electricity eliminating device further includes a blower, a air duct, and a discharging probe, wherein the blower provides pressurized airflow toward the discharging probe which discharges ionized electrons into the pressurized air Wherein the discharging probe is arranged vertically, and the air duct provides pressurized airflow horizontally Wherein the static electricity eliminating device further includes a fixture for attaching the air duct and the discharging probe to the vertical shaft Wherein the static electricity further includes a dust hood in which the vertical shaft, the blower, the air duct and the discharging probe are disposed within the dust hood In order to resolve the issue encountered by the prior art, the present invention provides a technical solution by introducing a forklift which comprises with a hoisting apparatus, a fork, and a static electricity eliminating, device, and wherein, the hoisting apparatus moves the fork and the static electricity eliminating device vertically, and the static electricity eliminating device provides ionized pressurized airflow toward an area above the fork.

Wherein the static electricity eliminating device is securely attached to the hoisting apparatus.

Wherein hoisting apparatus includes a pair of hoisting systems, wherein the static electricity eliminating device includes a pair of static electricity eliminating units each attached to one of the hoisting systems.

Wherein the static electricity can be rotated to a preset angle with respect to the hoisting system so as to provide the ionized wind, toward the area above the forklift during the rotation.

Wherein the static electricity eliminating device includes a vertical shaft, a driving mechanism, and a stand for attaching the static electricity eliminating device onto the hoisting apparatus, wherein the driving mechanism drives the vertical shaft to rotate such that the static electricity eliminating device will rotate with respect to the hoisting system.

Wherein the static electricity eliminating device further includes a blower, a air duct, and a discharging probe, wherein the blower provides pressurized airflow toward the discharging probe which discharges ionized electrons into the pressurized air.

Wherein the discharging probe is arranged vertically, and the air duct provides pressurized airflow horizontally.

Wherein the static electricity eliminating device further includes a fixture for attaching the air duct and the discharging probe to the vertical shaft.

Wherein the static electricity further includes a dust hood in which the vertical shaft, the blower, the air duct and the discharging probe are disposed within the dust hood.

In order to resolve the issue encountered by the prior art, the present invention provides a technical solution by introducing an automated warehouse system configured with a storing tower and a forklift for disposing and retrieving articles to and from the storing tower. Wherein the forklift comprises with a hoisting apparatus, a fork, and a static electricity eliminating device, wherein the hoisting apparatus moves the fork and the static electricity eliminating device vertically, and the static electricity eliminating device provides ionized pressurized airflow toward an area above the fork.

Wherein the hoisting apparatus includes a pair of hoisting system, and the static electricity eliminating devices includes two static electricity eliminating units each mounted onto one of the hoisting systems.

Wherein the static electricity eliminating device includes a vertical shaft, a driving mechanism, and a stand for attaching the static electricity eliminating device onto the hoisting apparatus, wherein the driving mechanism drives the vertical shaft to rotate such that the static electricity eliminating device will rotate with respect to the hoisting system.

Wherein the static electricity eliminating device further includes a blower, a air duct, and a discharging probe, wherein the blower provides pressurized airflow toward the discharging probe which discharges ionized electrons into the pressurized air.

The present invention can be concluded with the following advantages. As compared to the prior art, the present invention includes a static electricity eliminating device driven by the hoisting apparatus. The static electricity eliminating device discharges pressurized airflow with ions to an area above the fork so as to drain and ground the static electricity accumulated on the object loaded onto the fork. By ways of this, the static electricity within the automated warehouse can be effectively eliminated and controlled.

DETAILED DESCRIPTION OF EMBODIMENTS

Figure 1:
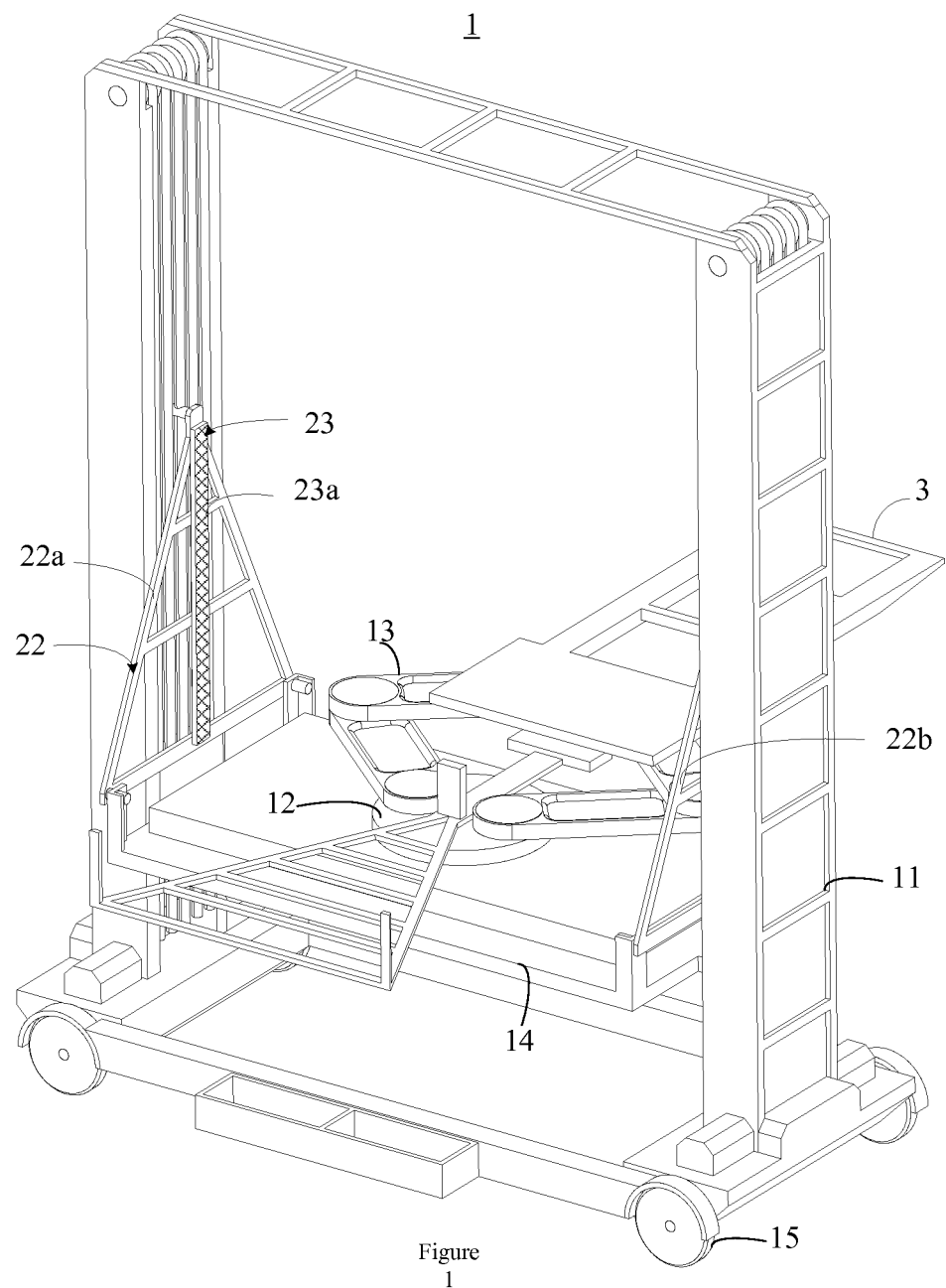
FIG. 1 is an illustrational and structural view of a forklift made in accordance with the present invention.

Referring, to FIG. 1, a forklift 1 made in accordance with the present invention includes a hoisting apparatus 22, a fork 3 and a static electricity eliminating device 23. The static electricity eliminating device 23 can be readily moved vertically by the operation of the hoisting apparatus 22. The static electricity eliminating, device 23 can provide pressurized ionized airflow to an area above the fork 3.

Substantially, in the present embodiment, the hoisting apparatus 22 includes a pair of hoisting systems 22a, 22b. The static electricity eliminating device 23 is mounted in a sideway, and includes a pair of static electricity eliminating device 23a, 23b which is mounted to each of the hoisting systems 22a, 72b.

The forklift 1 further includes a pair of pillars 11, a swinging mechanism 12, a telescopic mechanism 13, a platform 14, and a moving mechanism 15. Each of the hoisting system 22a, 22b is mounted to a corresponding pillars 11. The platform 14 is interconnected to the hoisting system 22a, 22b with its sides. The swinging system 12 is disposed on a central area of the platform 14, and is further interconnected to the telescopic mechanism 13. The telescopic mechanism 13 is further interconnected with a fork 3.

With the operation of the hoisting apparatus 22, the hoisting systems 22a, 22b will drive the platform 14, the swinging mechanism 12, the telescopic mechanism 13, the fork 3 and the static electricity eliminating unit 23a to move synchronically along the vertical direction. By maneuvering the telescopic mechanism 13 and the swinging mechanism 12, the fork 3 can be completely retrieved within the platform 14, or extend beyond the platform 14. The moving mechanism 15 is disposed under the pillars 11 so as to move the forklift 1 along a preset direction. By way of the above description, the forklift 1 can readily used to dispose or retrieve an object located on different levels along a preset line.

In the present embodiment, the static electricity includes a pair of static electricity eliminating units 23a. However, the quantity of the static electricity eliminating unit 23 can be one or more than one or any suitable number. On the other hand, the static electricity eliminating device 23 can be mounted onto other location of the forklift 1. For example, the static electricity eliminating unit can be mounted onto a location on the platform 14 adjacent to the hoisting apparatus 22 so as to supply pressurized ionized airflow toward an area above the fork 3. Additional, it can also be mounted onto a top of the forklift 1 and from there to deliver the pressurized ionized airflow to the fork 3.

Figure 2:
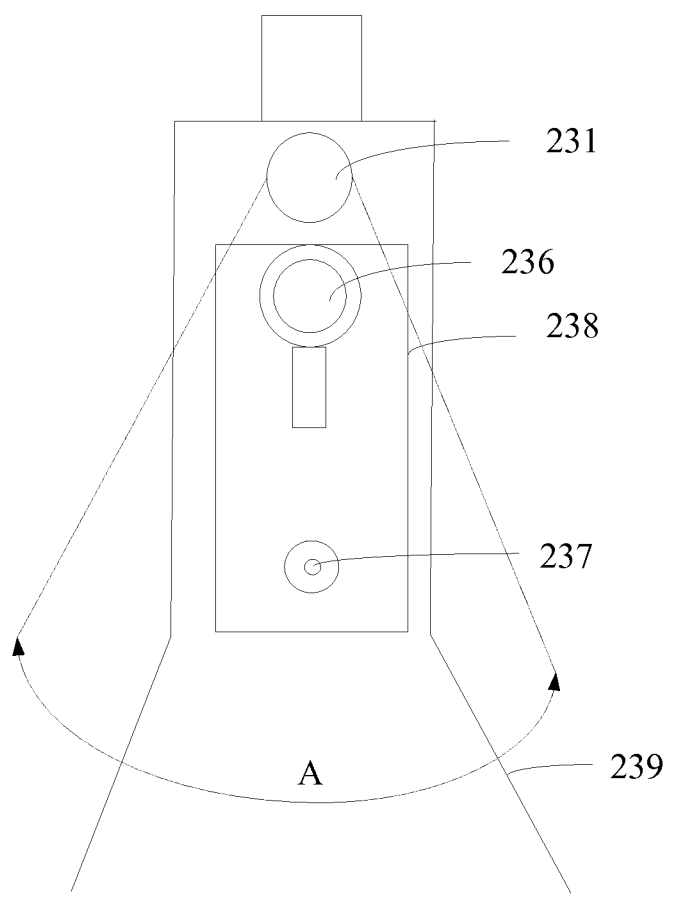
FIG. 2 is a top view of a static electric eliminating device shown in FIG. 1.
Figure 3:
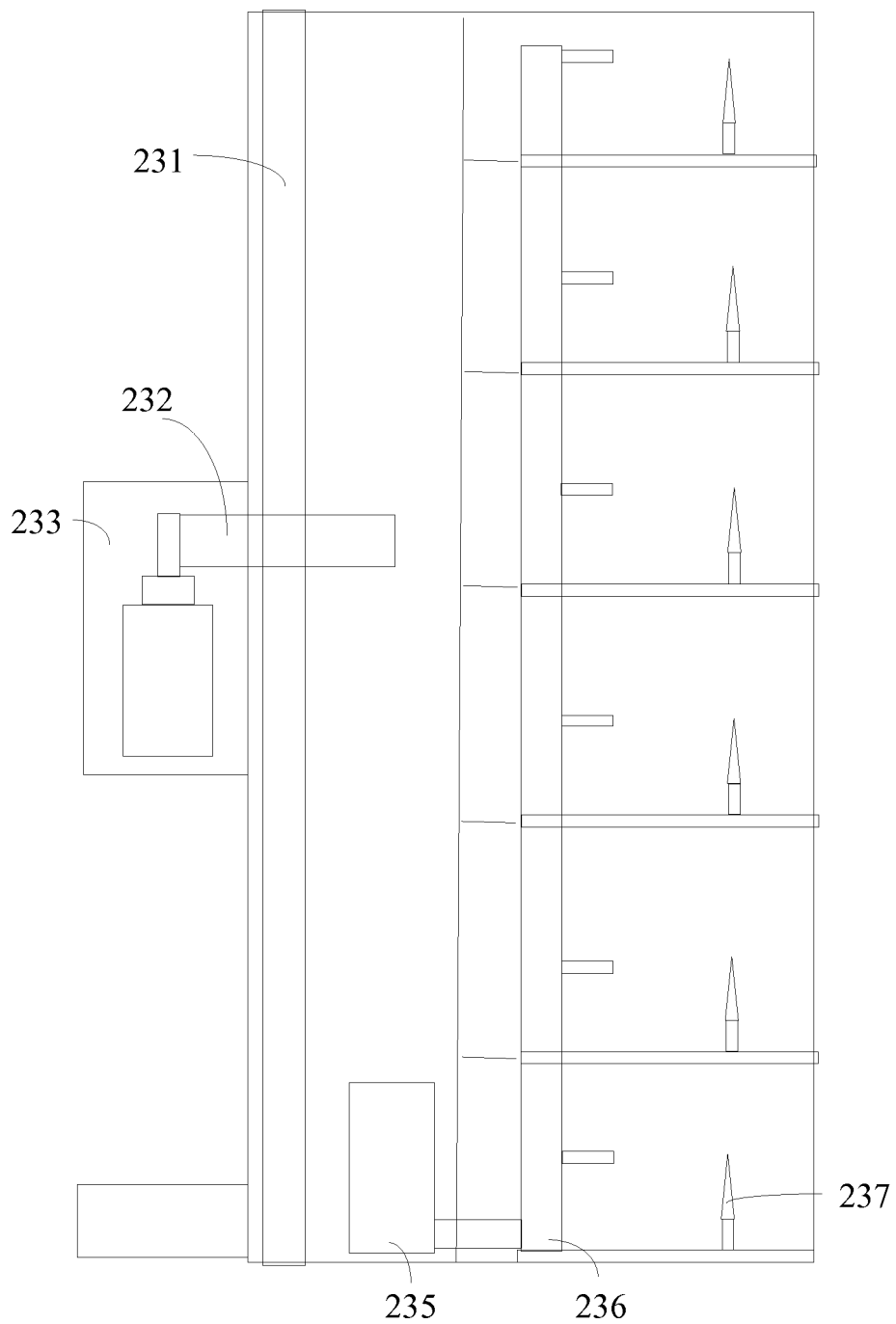
FIG. 3 is an illustrational and top view of the static electricity eliminating device shown in FIG. 2.

Referring now to FIGS. 2 and 3, the static electricity eliminating unit 23a further includes a rotating shaft 231, a transmitting mechanism 232, a stand 233, a blower 235, an air duct 236, a plurality of discharging probes 237, a fixture 238, and a dust hood 239.

The discharging probes 237 are arranged vertically and spaced from each other. The air duct 236 includes a basic duct (not shown) and a plurality of nozzle (not shown). The air duct is arranged vertically, and the nozzle is properly aligned with the discharging probe 237. The blower 235 will supply the pressurized airflow toward the discharging probe 237, and the discharging probe 237 will release ions into the pressurized airflow which is therefore filled with ions. Since the nozzle is vertically arranged with the duct, accordingly, the pressurized ionized airflow flows horizontally.

The fixture 233 is used to attach the static electricity eliminating unit 23a to the hoisting system 22a or 22b. The rotating shaft 231 is arranged vertically. The driving mechanism 232 drives the rotating shaft 231 to swing within a preset angle such that the static electricity eliminating unit will rotate with respect to the hoisting system. The rotational direction the static electricity eliminating systems 23a, 23b are opposite to each other. On the other hand, during the operation, the pressurized ionized airflow is directed toward an area above the fork 3 of the platform 14. As a result, the overage of the pressurized ionized airflow can readily and effectively eliminate accumulated static electricity loaded onto the fork, such as the cartridge filled with glass panels. Accordingly, the accumulated static electricity can he effectively eliminated so as to achieve the optimal result.

In the current embodiment, the transmitting mechanism 232 includes a servo motor (not shown) mounted onto the stand, and an output shaft (not shown) interconnected to the servo, and a belt connected to the rotating shaft 231.

The fixture 238 is used to securely attach the air duct 236 and the discharging probe 237. The rotating shaft 231, the blower 235, the air duct 236, and the discharging probe 237 are all installed within the dust hood 239.

As compared to the prior art, the forklift 1 of the present invention includes a static electricity eliminating device 23 driven by the hoisting apparatus 22. The static electricity eliminating device 23 discharges pressurized airflow with ions to an area above the fork 3 so as to drain and ground the static electricity accumulated on the object loaded onto the forklift 1. By ways of this, the static electricity within the automated warehouse can he effectively eliminated and controlled.

Figure 4:
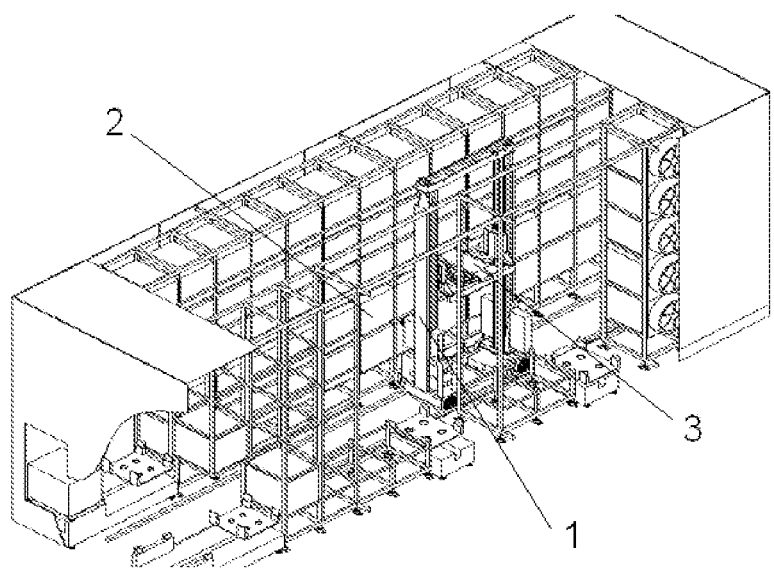
FIG. 4 is an illustrational view of an automated warehouse made in accordance with the present invention.

Referring to FIG. 4, the present invention farther provides a warehouse system which includes a forklift 1 and a storing tower 2. The forklift 1 can be used to dispose or retrieve the article stored within the tower 2. The detailed configuration and operation of the forklift can be readily referred to the above description.

Since the forklift 1 is incorporated with the static electricity eliminating device 23, accordingly, the static electricity accumulated in the warehouse system can be effectively eliminated, grounded and controlled.

Embodiments of the present invention have been described, but not intending to impose any unduly constraint to the appended claims. Any modification of equivalent structure or equivalent process made according to the disclosure and drawings of the present invention, or any application thereof, directly or indirectly, to other related fields of technique, is considered encompassed in the scope of protection defined by the clams of the present invention.

The invention claimed is:

1. A forklift, comprising:
    a pair of pillars;
    a hoisting apparatus including a pair of hoisting systems each arranged on one of the pillars;
    a fork;
    a static electricity eliminating device including two static electricity eliminating units each arranged on one of the pillars; and wherein the hoisting apparatus drives the forklift and the static electricity eliminating units to move upward and downward along the pillars and the static electricity eliminativing device provides ionized wind to an area located above the forklift.

2. The forklift as recited in claim 1, wherein each static electricity eliminating unit can be rotated to a preset angle with respect to the hoisting apparatus so as to provide the ionized wind toward the area above the forklift during the rotation.

3. The forklift as recited in claim 2, wherein each static electricity eliminating unit includes a vertical shaft, a driving mechanism, and a stand for attaching the static electricity eliminating unit onto one of the hoisting systems, wherein the driving mechanism drives the vertical shaft to rotate such that the static electricity eliminating unit will rotate with respect to the hoisting system.

4. The forklift as recited in claim 3, wherein each static electricity eliminating device further includes a blower, an air duct, and a discharging probe, wherein the blower provides pressurized airflow toward the discharging probe which discharges ionized electrons into the pressurized air.

5. The forklift as recited in claim 4, wherein the discharging probe is arranged vertically, and the air duct provides pressurized airflow horizontally.

6. The forklift as recited in claim 4, wherein eah static electricity eliminating unit further includes a fixture for attaching the air duct and the discharging probe to the vertical shaft.

7. The forklift as recited in claim 6, wherein each static electricity eliminating unit further includes a dust hood in which the vertical shaft, the blower, the air duct and the discharging probe are disposed within the dust hood.

8. A forklift comprising a hoisting apparatus, a fork, and a static electricity eliminating device, wherein the hoisting apparatus moves the fork and the static electricity eliminating, device vertically, and the static electricity eliminating device provides ionized pressurized airflow toward an area above the fork.

9. The forklift as recited in claim 8, wherein the static electricity eliminating device is securely attached to the hoisting apparatus.

10. The forklift as recited in claim 9, wherein the hoisting apparatus includes a pair of hoisting systems, wherein the static electricity eliminating device includes a pair of static electricity eliminating units each attached to one of the hoisting systems.

11. The forklift as recited in claim 10, wherein the static electricity eliminating units can be rotated to a preset angle with respect to the hoisting systems so as to provide the ionized wind, toward the area above the forklift during the rotation.

12. The forklift as recited in claim 11, wherein each static electricity eliminating unit includes a vertical shaft, a driving mechanism, and a stand for attaching the static electricity eliminating device onto one of the hoisting systems, wherein the driving mechanism drives the vertical shaft to rotate such that the static electricity eliminating unit will rotate with respect to the hoisting system.

13. The forklift as recited in claim 12, wherein each static electricity eliminating unit further includes a blower, an air duet, and a discharging probe, wherein the blower provides pressurized airflow toward the discharging probe which discharges ionized electrons into the pressurized air.

14. The forklift as recited in claim 13, wherein the discharging probe is arranged vertically, and the air duct provides pressurized airflow horizontally.

15. The forklift as recited in claim 13, wherein each static electricity eliminating unit further includes as fixture for attaching the an duct and the discharging probe to the vertical shaft.

16. The forklift as recited in claim 15, wherein each static electricity eliminating unit further includes a dust hood in which the vertical shaft, the blower, the air duct and the discharging probe are disposed within the dust hood.

17. An automated warehouse system configured with a storing tower and a forklift for disposing and retrieving articles to and from the storing tower, wherein the forklift comprises a hoisting apparatus, a fork, and a static electricity eliminating device, wherein the hoisting apparatus moves the fork and the static electricity eliminating device vertically, and the static electricity eliminating device provides ionized pressurized airflow toward an area above the fork.

18. The automated warehouse system as recited in claim 17, wherein the hoisting apparatus includes a pair of hoisting systems, and the static electricity eliminating device includes two static electricity eliminating units each mounted onto one of the hoisting systems.

19. The automated warehouse system as recited in claim 18, wherein each static electricity eliminating unit includes a vertical shaft, a driving mechanism, and a stand for attaching the static electricity eliminating device onto one of the hoisint systems, wherein the driving mechanism drives the vertical shaft to rotate such that the static electricity eliminating unit will rotate with respect to the hoisting system.

20. The automated warehouse system as recited in claim 19, wherein each static electricity eliminating unit further includes a blower, a air duct, and a discharging probe, wherein the blower provides pressurized airflow toward the discharging probe which discharges ionized electrons into the pressurized air.

* * * * *